US 8,773,669 B2

(12) United States Patent
Kubota et al.

(10) Patent No.: US 8,773,669 B2
(45) Date of Patent: Jul. 8, 2014

(54) OPTICAL DEVICE

(71) Applicant: Kabushiki Kaisha Toshiba, Tokyo (JP)

(72) Inventors: Hiroshi Kubota, Tokyo (JP); Nobu Matsumoto, Kanagawa (JP); Mineharu Uchiyama, Kanagawa (JP); Keiichiro Mori, Kanagawa (JP); Hisao Kawasato, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/786,424

(22) Filed: Mar. 5, 2013

(65) Prior Publication Data

US 2014/0022558 A1 Jan. 23, 2014

(30) Foreign Application Priority Data

Jul. 17, 2012 (JP) ................................. 2012-158648

(51) Int. Cl.
*G01B 11/14* (2006.01)
*G01B 11/02* (2006.01)
*G01B 11/00* (2006.01)

(52) U.S. Cl.
CPC .............. *G01B 11/14* (2013.01); *G01B 11/026* (2013.01); *G01B 11/002* (2013.01)
USPC ....................................................... 356/614

(58) Field of Classification Search
CPC ............................. G01B 11/14; G01B 11/026
USPC .................... 356/601–614; 250/493.1, 503.1; 435/168, 156
See application file for complete search history.

(56) References Cited

U.S. PATENT DOCUMENTS

| | | | | |
|---|---|---|---|---|
| 5,004,929 A * | 4/1991 | Kakinoki et al. | ........ | 250/559.06 |
| 6,108,132 A * | 8/2000 | Itoh | .......................... | 359/485.04 |
| 6,222,674 B1 * | 4/2001 | Ohta | .............................. | 359/618 |
| 6,467,911 B1 * | 10/2002 | Ueyama et al. | ................. | 353/87 |
| 6,710,770 B2 | 3/2004 | Tomasi et al. | | |
| 7,331,680 B2 * | 2/2008 | Lee et al. | ......................... | 353/81 |
| 7,671,843 B2 * | 3/2010 | Montellese | .................. | 345/168 |
| 2006/0012802 A1 * | 1/2006 | Shirley | .......................... | 356/603 |
| 2008/0018558 A1 * | 1/2008 | Kykta et al. | ..................... | 345/58 |
| 2010/0322372 A1 * | 12/2010 | Brady | ............................... | 378/4 |

FOREIGN PATENT DOCUMENTS

| | | |
|---|---|---|
| JP | 2000-089363 | 3/2000 |
| JP | 2008-287142 | 11/2008 |
| JP | 2011-237553 | 11/2011 |

* cited by examiner

*Primary Examiner* — Sang Nguyen
(74) *Attorney, Agent, or Firm* — Patterson & Sheridan, LLP

(57) ABSTRACT

According to one embodiment, an optical device includes emission of an image projecting light source and emission of an optical path length measuring light source are provided by a light projecting device and respective beams are directed to a moveable mirror. In accordance with the movement of moveable mirror, an image projecting light scans a target and an image is displayed. Reflected light is scattered from the target and reaches a photodetector. By calculating the time difference of reference light and reflected light detected by the photodetector, the distance of the optical device and a reflection point of an optical path length measuring light is computed. By combining the computed optical path length data and angle data of the moveable mirror, the reflecting point of the optical path length measuring light is determined.

20 Claims, 2 Drawing Sheets

OPTICAL DEVICE

CROSS-REFERENCE TO RELATED APPLICATION

This application is based upon and claims the benefit of priority from Japanese Patent Application No. 2012-158648, filed Jul. 17, 2012; the entire contents of which are incorporated herein by reference.

FIELD

Embodiments described herein relate generally to an optical device including a mechanism for image projection that uses a moveable optical path altering device, and an optical path length calculation method.

BACKGROUND

An optical device including a mechanism for image projection and position detection is known. The optical device contains an image projecting mechanism and a mechanism to detect objects that exist on the projected image, and includes a technology that inputs data through a projected virtual input terminal.

However, with the conventional technology, the image projecting mechanism and the position detecting mechanism each use an independent optical mechanism, and due to size or geometric restrictions, miniaturization is difficult, and the position detection range is also geometrically restricted.

DETAILED DESCRIPTION

According to the embodiments, a compact optical device that is able to calculate an optical path length or to detect a position of an object(s) in an entire image display range is provided.

In general, according to the embodiments, the device will be explained below with reference to the attached drawings. However, the present disclosure is not limited to the embodiments shown and described.

According to one of the embodiments of the present disclosure, an optical device including the following is provided: a light source for measuring optical path length; a light source for image projection; a light projection device to project the lights from the light sources for measuring optical path length and image projection onto the same optical path; an optical path direction changing device, that changes the optical path of the light from the light projection device by a designated angle, and projects them onto the designated target; a light detecting indicator that detects the reflected light from the designated target; an optical path length calculator that calculates the optical path length based on the detection results from the light detecting indicator; calculation results from the optical path length calculator; and a position calculator that calculates the position of the designated target from an angle data of the optical path.

(First Embodiment)

Figure 1:
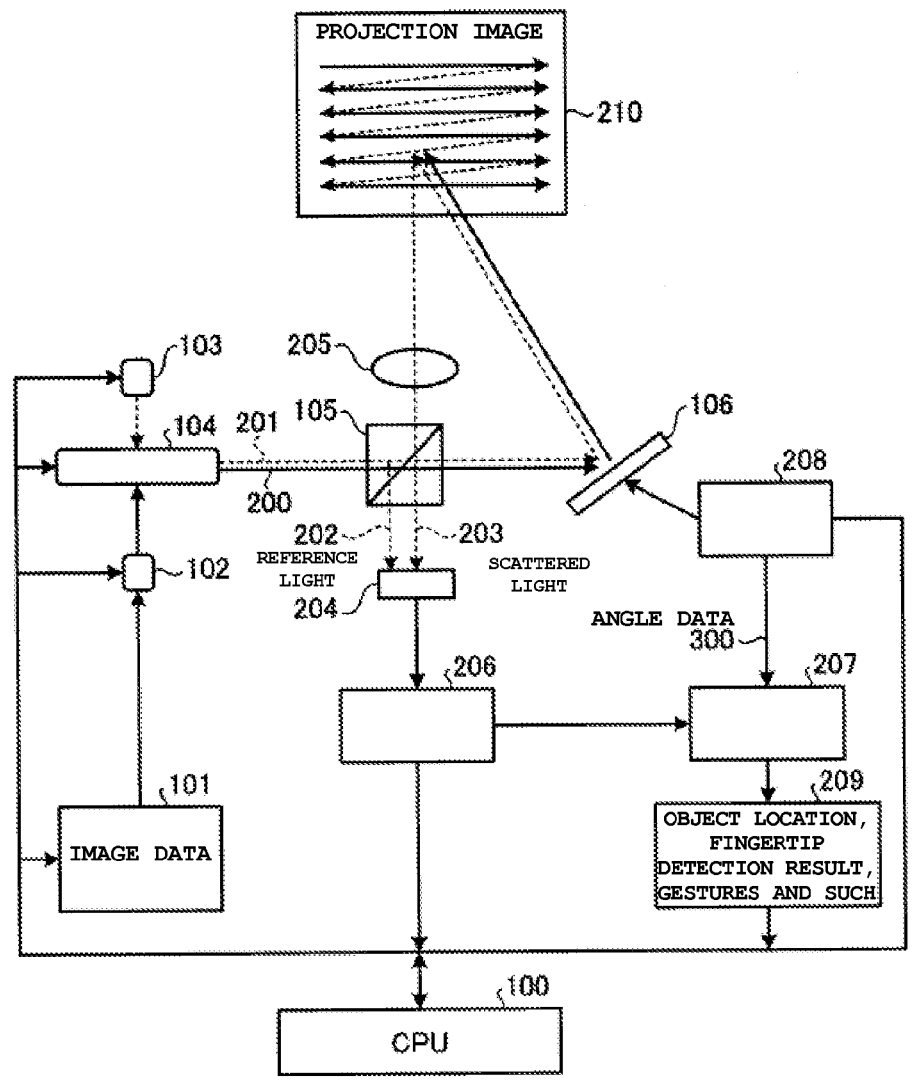
FIG. 1 is a schematic diagram illustrating a first embodiment.

FIG. 1 shows a structure of an optical device (referred as the present device from here on) according to the first embodiment. Image data stored in an image memory 101 is provided to an image projecting emission device 102 (first light source) where an image projecting light source (not shown) and a light control device (not shown) which controls the light intensity of the image projecting light source are placed. The image projecting light source includes a laser diode (not shown) that emits visible lights of colors Red (R), Green (G), and Blue (B). The emission intensities of each of the laser diodes are controlled by the light control device in accordance with the image data, those emissions are directed to a light projecting device 104.

An optical path length measuring emission device 103 (second light source) includes an optical path length measuring light source (not shown) and a light control device which controls the light intensity of the optical path length measuring light source, and those emissions are provided to the light projecting device 104. Optical path length measuring light source maybe for instance, a laser diode that emits non-visible light such as light in the infrared spectrum.

The light projecting device 104 includes a light reflecting mirror (not shown) and a prism (not shown), the incoming image projecting light and optical path length measuring light are synthesized and projected on the same optical path as an image projecting light beam 200 and an optical path length measuring light beam 201. Now, in the figures, image projecting light beam 200 and optical path length measuring light beam 201 are schematically shown as separate lines. The synthesized light from the light projecting device 104 is directed to a splitter 105. The splitter 105 extracts a portion of the optical path length measuring light beam 201 and provides a reference light 202 to a photodetector 204 (light detecting indicator).

The image projecting light beam 200 and the optical path length measuring light beam 201 that passes through the splitter 105 is projected onto a projection surface 210 after the optical path is altered by a moveable mirror 106. The moveable mirror 106 is a mirror that reflects light, and exterior control enables changes in the reflecting direction of light, that is, altering the reflection angle of the light. The moveable mirror 106 is driven by a mirror driving device 208, and based on the movement of the moveable mirror 106, the image projecting light is scanned above the projection surface 210 and an image is displayed. The solid lines schematically shown on the projection surface 210 are the scanning lines for image display; the image projecting light beam 200 is projected during the period of this display scanning line. During the period of this display scanning line, optical path length measuring light beam 201 is also projected, and is reflected by the moveable mirror 106 and projected on the same scanning line as the image display light beam 200. The dotted lines, schematically shown on the projection surface 210, are the blanking periods of when the image which is not displayed; that is, only the optical path length measuring light beam 201, which is a non-visible light, is projected. By scanning the image projecting light on the projection surface 210 from the top left position as the starting point to the bottom right position as the ending point, an image display of one frame is performed.

The optical path length measuring light beam 201, that becomes scattered light from reflecting on the surface of the object that exists on the projection surface 210, or the optical path of optical path length measuring light beam 201, reaches the photodetector 204 through a lens 205 and the splitter 105. The photodetector 204 includes a photodiode and responds to the optical path length measuring light beam 201.

Using the difference in arrival time of the reference light 202 and the scattered light 203 detected by the photodetector

204, the distance of the present device and the reflection point of the optical path length measuring light beam 201 is calculated by an optical path length calculator 206. The calculated optical path length data is provided to a position calculator 207.

Angle data 300 of the moveable mirror 106 is issued to the position calculator 207 through the mirror driving device 208. The angle data 300 of the moveable mirror 106 is the data that represents the direction where the optical path length measuring light beam 201 and the image projecting light beam 200 are being projected by the moveable mirror 106. By combining the angle data and the calculated results of the optical path length, the position where the optical path length measuring light is reflected may be determined.

The position data which is the calculation result of position calculator 207 is provided to an object position storing memory 209. The data of the optical path length calculator 206 and the object position storing memory 209 are provided to a central processing unit (CPU) 100. Storing the data obtained from each scanning of the optical path length measuring light above the projection surface 210 as a continuous data into the object position storing memory 209, and then, by analyzing the difference in those position data with the CPU 100, the movement of the object that reflected the optical path length measuring light beam 201 may be determined.

For instance, if the reflection point of the optical path length measuring light beam 201 remains unchanged at a rest state, then the object that reflected the optical path length measuring light is recognized as a motionless object. If the reflection point of the optical path length measuring light beam 201 changes for each frame, then the object that reflected the optical path length measuring light is concluded to be accompanied by movement, or a series of movements. As an example, if the projection image is an image of a keyboard and a person operating the keyboard, by analyzing the series of movements at the reflecting point of the reflecting target of the optical path length measuring light beam 201, this may be recognized as a person's hand movement (gesture) pressing a specific key on the keyboard. That is, this recognition action may be executed by analyzing the series of changes in the position data for each frames of the projection image stored in the object position storing memory 209 with the CPU 100.

According to the embodiment of the present device, since non-visible lights are used as the optical path length measuring light, even if they are scanned on the same optical path as the image projecting light, there are no restrictions on achieving the dual functions of image display and optical path length measuring.

According to the embodiment of the present device, since image display and optical path length measuring is implemented as the same unit, reduction of parts count along with miniaturization of the device may be realized.

According to the embodiment of the present device, since the image projecting location, (i.e. the location of the moveable mirror 106) and the optical path length detecting location, (i.e. the location of the photodetector 204) is always at identical points, the positional relationship of the present device and the reflecting target will not differ. Thus, the accuracy of determining the reflecting target is high.

According to the embodiment of the present device, since the scattered light of optical path length measuring light reaches photodetector 204 through the lens 205, the amount of scattered light that is received by the device increases, by increasing the size of lens 205. Thus, S/N ratio may be improved.

In the embodiment of the present device, reference light 202 is extracted using the splitter 105. Generally, the photodetector 204 has better detection accuracy when the magnitude of luminous energies of the incoming scattered light and reference light are closer. However, a structure that uses the scattered light of the optical path length measuring light emitted from the light projecting device 104 as the reference light without the use of splitters is also possible.

(Second Embodiment)

Figure 2:
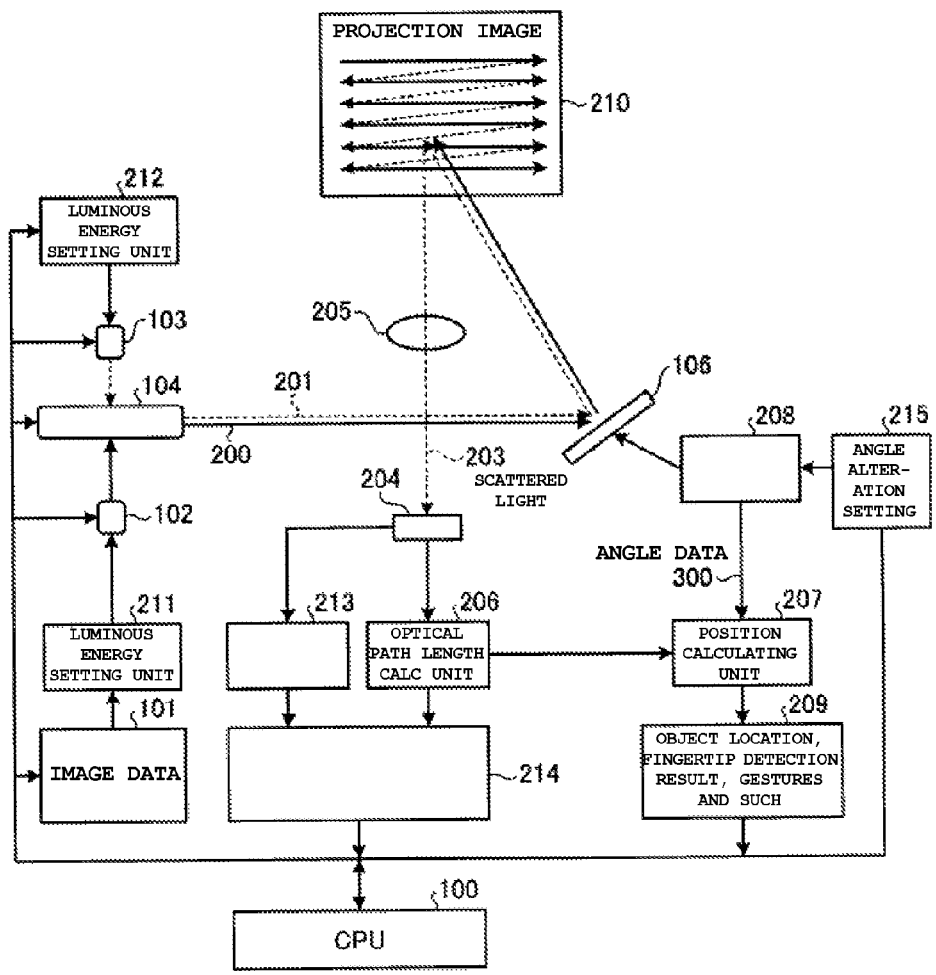
FIG. 2 is a schematic diagram illustrating a second embodiment.

FIG. 2 shows the structure of the optical device in the second embodiment. Common structures to the first embodiment as shown in FIG. 1 will have identical numbering and will not be described further for brevity.

In the embodiment shown in FIG. 2, image data of the image memory 101 is directed to the image projecting emission device 102 through an image luminous energy setting unit 211. The optical path length measuring emission device 103 is provided with control signals from an optical path length luminous energy setting unit 212.

The image projecting light beam 200 and optical path length measuring light beam 201 from the light projecting device 104 are directed to the moveable mirror 106 without going through a splitter. The optical path is altered by the moveable mirror and then projected onto the projection surface 210. The scattered light 203 of optical path length measuring light is reflected by the projection surface 210, or some object surface, and enters the photodetector 204 through the lens 205.

A received luminous energy measuring device 213 measures the amount of the luminous energy received by the photodetector 204. The measurement results are provided to a received luminous energy/optical path length storing memory 214.

The optical path length calculator 206 computes the optical path length from the present device to the projection surface or the designated object by detecting the scattered light 203 of the optical path length measuring light which is detected by the photodetector 204. For instance, optical path length measuring light beam 201 is emitted at the designated timing, and the optical path length from the present device to the reflecting point of optical path length measuring light is computed by calculating the difference in time of that emission timing and when the photodetector 204 detects the scattered light 203. The computed results of the optical path length are issued to the received luminous energy/optical path length storing memory 214.

The present embodiment is provided with an angle alteration setting unit 215 that alters and/or sets the driving angle of a mirror driving device 208, which drives the moveable mirror 106 controlled by the CPU 100.

By containing the received luminous energy measuring device 213; the image luminous energy setting unit 211 that sets the luminous energies of the image projecting emission device 102 and the optical path length measuring emission device 103; and the optical path length luminous energy setting unit 212, the following functions are achieved.

When the received luminous energy of the received luminous energy measuring device 213 exceeds a designated control value, it is determined that projection is done in an extraordinary state and with the control of the CPU 100. Then, the amount of luminescence of the image projecting emission device 102 and the optical path length measuring emission device 103 are adjusted.

For the case when received luminous energy exceeds the designated control value, it may be the case that the distance of the present device and the reflecting target of the optical path length measuring light may be extremely short; or there may be a chance that a person is looking into the present device, which in that case luminous energy of the image projecting emission device 102 and the optical path length measuring emission device 103 are decreased to secure safety. On the other hand, if the received luminous energy is low, the amount of luminescence of the image projecting emission device 102 may be increased to maintain a fixed brightness of the display image.

If the received luminous energy exceeds the designated control value and is extremely small, a control to lower the amount of luminescence of the image projecting emission device 102 or the optical path length measuring emission device 103 will be performed. There may be a case where it is not projected on the designated projection surface; in that case, the amount of luminescence is controlled to secure safety.

With the received luminous energy of the photodetector 204, the brightness of the surroundings of the present device is detected. Based on that result, by increasing the amount of luminescence of the image projecting emission device 102, improvement in image quality is achieved.

If the optical path length from the present device to the reflecting target is long; since the distance from the present device to the image projection surface is far, by increasing the amount of luminescence of the image projecting emission device 102, a fixed brightness of the display image may be maintained.

When measuring the optical path length, and taking into consideration the characteristics of the photodetector 204 and such, generally, there exists an ideal amount of received luminous energy. By changing the amount of luminescence of the optical path length measuring light, an improvement in measurement accuracy and a decrease in power consumption is enabled.

In addition, if the optical path length from the present device to the reflecting target is long; since the distance from the present device to the image projection surface is far, the image size to be displayed becomes larger. Because of this, under the control of the CPU 100, by controlling the angle alteration setting unit 215 to adjust the angle alteration of the moveable mirror 106, a control to decrease the size of the display image, and maintain a fixed image quality or brightness of the display image, may be performed.

If the optical path length from the present device to the reflecting target is long and exceeds the designated control value, under the control of the CPU 100, a control to lower the amount of luminescence of the image projecting emission device 102 or the optical path length measuring emission device 103 will be performed. There may be a case where it is not projected on the designated projection surface. In that case, the amount of luminescence is controlled to secure safety.

Since the projection range of the image may be adjusted by changing the driving angle of the moveable mirror, a proper image display is possible on a projection surface that is for instance, when the projection surface is tilted at an angle relative to the present device. For example, when projecting a square shaped image at positions far from the present device, the swing angle of the moveable mirror should be tightened. For positions near the present device, the swing angle of the moveable mirror should be widened. With such adjustments, the desired square shaped image is displayed without having the display image being a trapezoidal form. Thus, distortion of the display image is prevented.

In the present embodiment, since the image projecting light and the optical path length measuring light follows identical optical paths due to the moveable mirror, the scanning range of the optical path length measuring light is virtually equivalent to the image projection range. Projection surface may be selected once confirming there are no protrusion or steps by scanning the optical path length measuring light at the designated range. By selecting the projection range, this enables a reduction of size and/or the geometric restrictions required for the present device.

The embodiment of the present device may be loaded onto a cellular phone with a camera to further strengthen the cognitive function of object positions. In addition to the detection of object position in the embodiment of the present device, by performing object recognition using the camera function of the cellular phone and with both data combined by the CPU, shadows formed by objects may be reduced.

If the display image is black, only the optical path length measuring light of non-visible light is scanned to obtain object position information. If the display image exists, the object position information may be obtained from one of the R, G, B lights from the image projecting emission device and its reflected light. In this case, only one of optical path length measuring light of image projecting light is emitted according to the period of when the image is black (or anything other) to reduce power consumption.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical device, comprising:
a first light source for projecting an image;
a second light source used for measuring an optical path length;
a light projection device to project light beams from the first light source and the second light source;
an optical path direction changing device that changes an optical path of the light beams from the light projection device by a designated angle and projects the light beams onto a target;
a light detecting unit that detects reflected light from the target;
an optical path length calculator that calculates an optical path length based on detection results from the light detecting unit; and
a position calculator that calculates a position of the designated target on the basis of calculation results from the optical path length calculator and an angle data of the optical path.

2. The device of claim 1, further comprising:
a unit for adjusting an angle of the optical path direction changing device, according to the calculated result from the optical path length calculator.

3. The device of claim 2, wherein a wavelength range of the second light source is different than a wavelength range of the first light source.

4. The device of claim 2, wherein the light beams from the first light source and the second light source are directed along a common optical path.

5. The optical device of claim 2, wherein
the optical path direction changing device comprises a moveable mirror.

6. The device of claim 1, further comprising:
a beam splitter positioned in the optical path between the light projection device and the optical path changing device, wherein a portion of the light beams from the light projecting device is provided to the light detecting unit.

7. The optical device of claim 6, wherein
the optical path direction changing device comprises a moveable mirror.

8. The device of claim 1, wherein a wavelength range of the second light source is different than a wavelength range of the first light source.

9. The device of claim 8, wherein the light beams from the first light source and the second light source are directed along the same optical path.

10. The optical device of claim 8, wherein
the optical path direction changing device comprises a moveable mirror.

11. The device of claim 1, further comprising:
a luminous energy calculator that measures received luminous energy from the detection results of the light detecting indicator.

12. The device of claim 11, further comprising:
a control unit for adjusting luminous energies of at least one of the first light source and the second light source, according to data provided by the luminous energy calculator.

13. The device of claim 11, further comprising:
a unit for adjusting an angle of the optical path direction changing device, according to the calculated result from the optical path length calculator.

14. The device of claim 11, wherein a wavelength range of the second light source is different than a wavelength range of the first light source.

15. The optical device of claim 11, wherein
the optical path direction changing device comprises a moveable mirror.

16. An optical device, comprising:
a first light source for projecting an image;
a second light source for measuring an optical path length;
a light projection device to project light beams from the first light source and the second light source along a common optical path;
a moveable reflector that changes the optical path of the light beams from the light projection device by a designated angle and projects the light beams onto a target;
a light detecting unit that detects reflected light from the target;
an optical path length calculator that calculates an optical path length based on detection results from the light detecting indicator; and
a position calculator that calculates a position of the designated target on the basis of calculation results from the optical path length calculator and an angle data of the optical path.

17. The device of claim 16, further comprising:
a luminous energy calculator that measures received luminous energy from the detection results of the light detecting indicator.

18. The device of claim 16, further comprising:
a control unit for adjusting luminous energies of at least one of the first light source and the second light source, according to data provided by the luminous energy calculator.

19. The device of claim 16, further comprising:
a unit for adjusting an angle of the optical path direction changing device, according to the calculated result from the optical path length calculator.

20. An optical device, comprising:
a first light source for projecting an image;
a second light source for measuring an optical path length, wherein each of the first light source and the second light source are provided at different wavelength ranges;
a light projection device to project light beams from the first light source and the second light source along a common optical path;
a moveable reflector that changes the optical path of the light beams from the light projection device at a designated angle and projects the light beams onto a target;
a light detecting unit that detects reflected light from the target;
an optical path length calculator that calculates an optical path length based on detection results from the light detecting indicator; and
a position calculator that calculates a position of the designated target on the basis of calculation results from the optical path length calculator and an angle data of the optical path.

* * * * *